United States Patent
Suzuki

(10) Patent No.: US 10,481,839 B2
(45) Date of Patent: Nov. 19, 2019

(54) COMMUNICATION SYSTEM, MOBILE TERMINAL, AND DEVICE

(71) Applicant: Katsunori Suzuki, Tokyo (JP)

(72) Inventor: Katsunori Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/723,319

(22) Filed: Oct. 3, 2017

(65) Prior Publication Data

US 2018/0101334 A1    Apr. 12, 2018

(30) Foreign Application Priority Data

Oct. 7, 2016 (JP) .................................. 2016-199385
Sep. 6, 2017 (JP) .................................. 2017-171532

(51) Int. Cl.
G06F 3/12 (2006.01)
H04N 1/00 (2006.01)
(Continued)

(52) U.S. Cl.
CPC ............ *G06F 3/121* (2013.01); *G06F 3/1222* (2013.01); *G06F 3/1238* (2013.01); *G06F 3/1244* (2013.01); *G06F 3/1267* (2013.01); *G06F 3/1285* (2013.01); *G06F 3/1292* (2013.01); *H04N 1/00244* (2013.01); *H04L 67/1097* (2013.01); *H04M 1/72533* (2013.01); *H04W 4/80* (2018.02)

(58) Field of Classification Search
None
See application file for complete search history.

(56) References Cited

U.S. PATENT DOCUMENTS 7,907,292 B2    3/2011  Suzuki
8,139,500 B2    3/2012  Suzuki
(Continued)

FOREIGN PATENT DOCUMENTS

| JP | 2013-190897 | 9/2013 |
| JP | 2015-032026 | 2/2015 |
| JP | 2016-051431 | 4/2016 |

*Primary Examiner* — Dov Popovici
(74) *Attorney, Agent, or Firm* — IPUSA, PLLC

(57) ABSTRACT

A communication system includes a mobile terminal; an information processing apparatus; and a device. The mobile terminal communicates with the information processing apparatus. The mobile terminal communicates with the device. The device communicates with the information processing apparatus. The mobile terminal includes a first processor executing a process including transmitting, by a first communication device, output data to be output by the device, to the information processing apparatus; and transmitting, by a second communication device, acquisition location specification information to the device, the acquisition location specification information specifying a location from which the output data is to be acquired by the device from the information processing apparatus. The device includes a second processor executing a process including receiving the acquisition location specification information from the mobile terminal; acquiring the output data from the information processing apparatus according to the acquisition location specification information; and outputting the output data.

16 Claims, 13 Drawing Sheets

(51) Int. Cl.
  *G06K 15/00*    (2006.01)
  *H04M 1/725*   (2006.01)
  *H04W 4/80*    (2018.01)
  *H04L 29/08*   (2006.01)

(56)          References Cited

U.S. PATENT DOCUMENTS

| | | |
|---|---|---|
| 8,355,150 B2 | 1/2013 | Suzuki |
| 8,526,041 B2 | 9/2013 | Suzuki |
| 8,654,379 B2 | 2/2014 | Suzuki |
| 8,861,010 B2 | 10/2014 | Suzuki |
| 9,110,614 B2 | 8/2015 | Miyake et al. |
| 9,471,328 B2 | 10/2016 | Fukasawa |
| 2010/0309500 A1 | 12/2010 | Suzuki |
| 2015/0049359 A1* | 2/2015 | Lee ............... G06F 3/1292 358/1.15 |
| 2015/0154484 A1* | 6/2015 | Iwasaki ......... G06K 15/4095 358/1.14 |
| 2016/0065718 A1 | 3/2016 | Yamada |

* cited by examiner

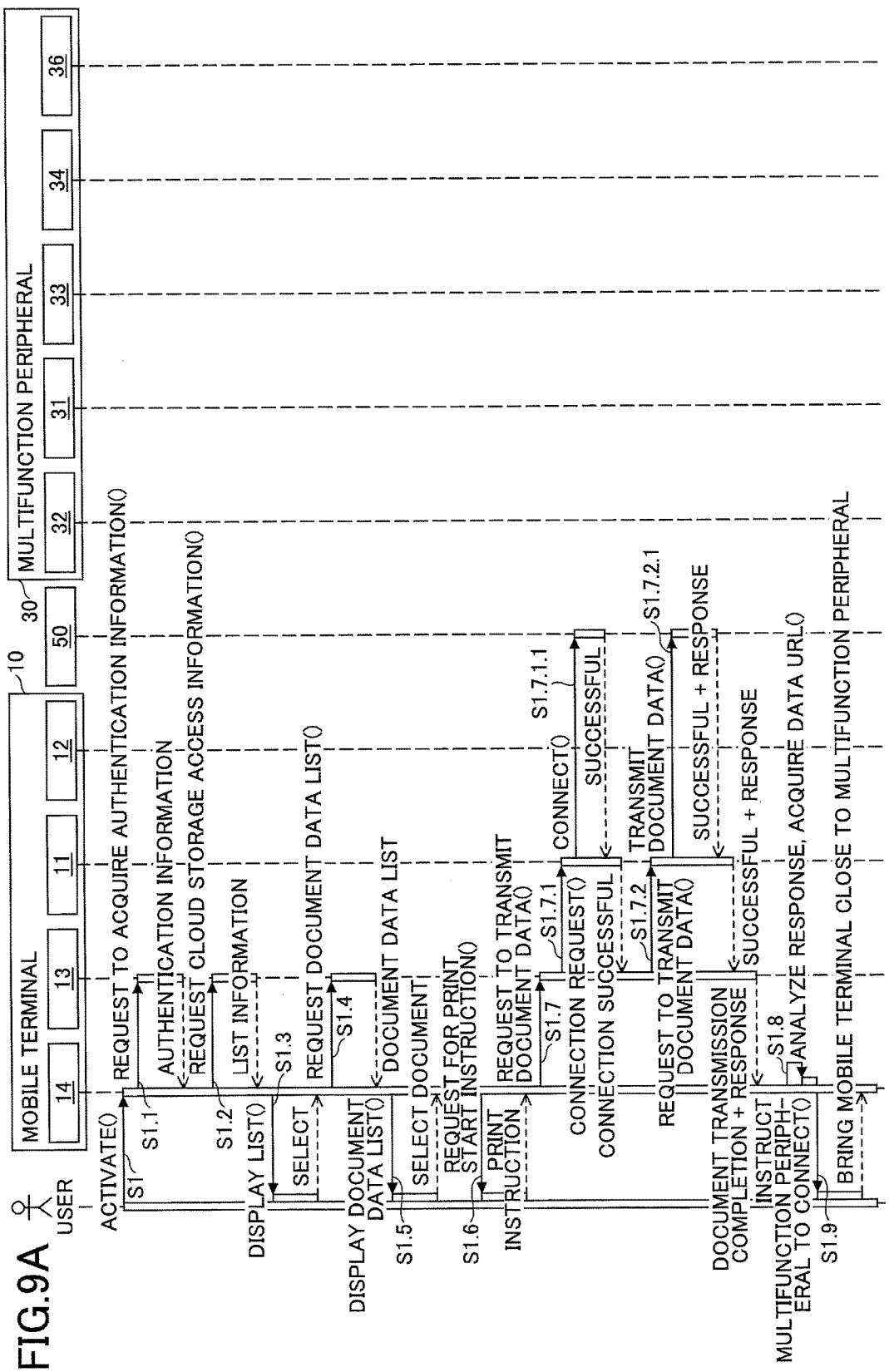

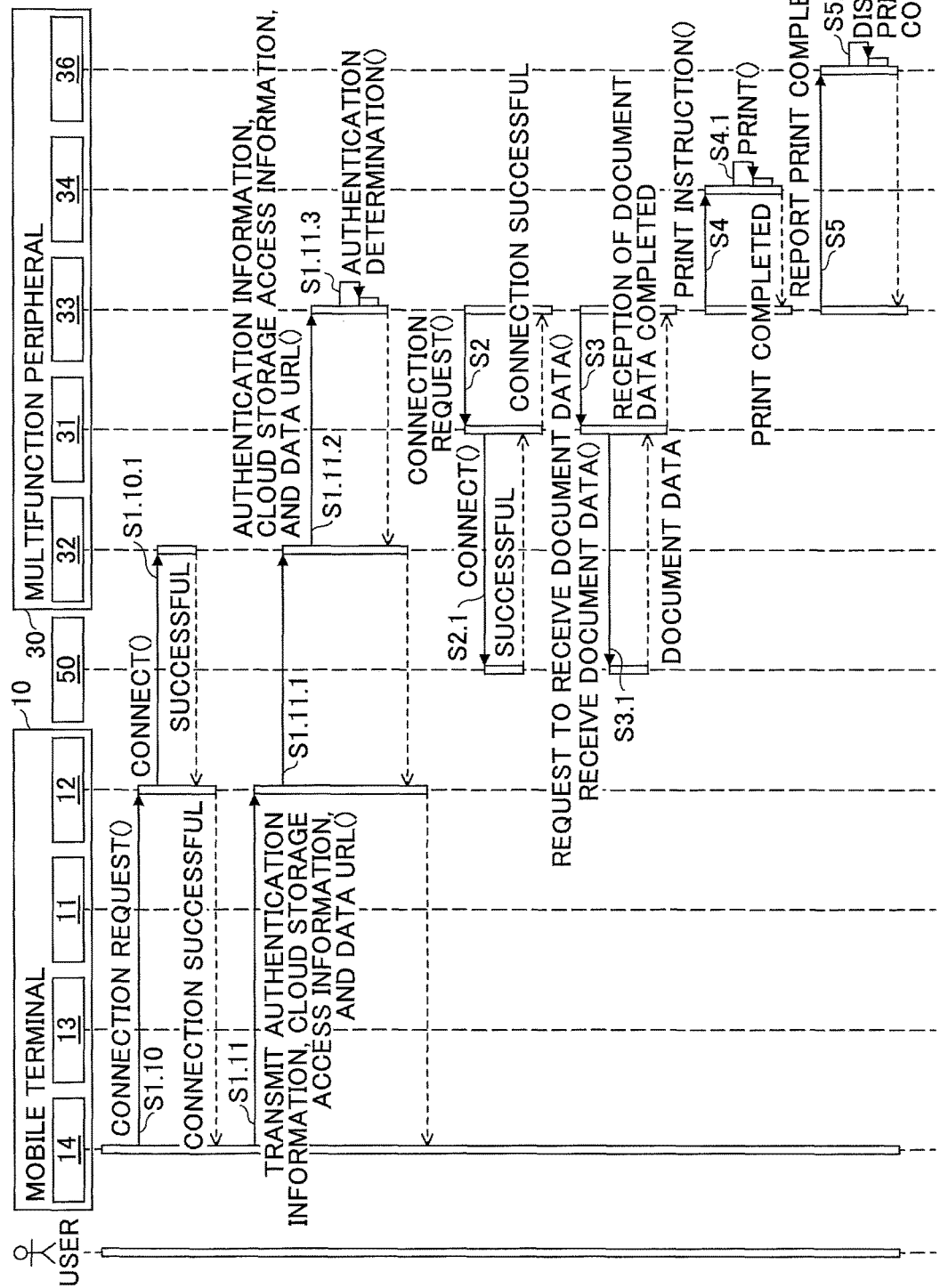

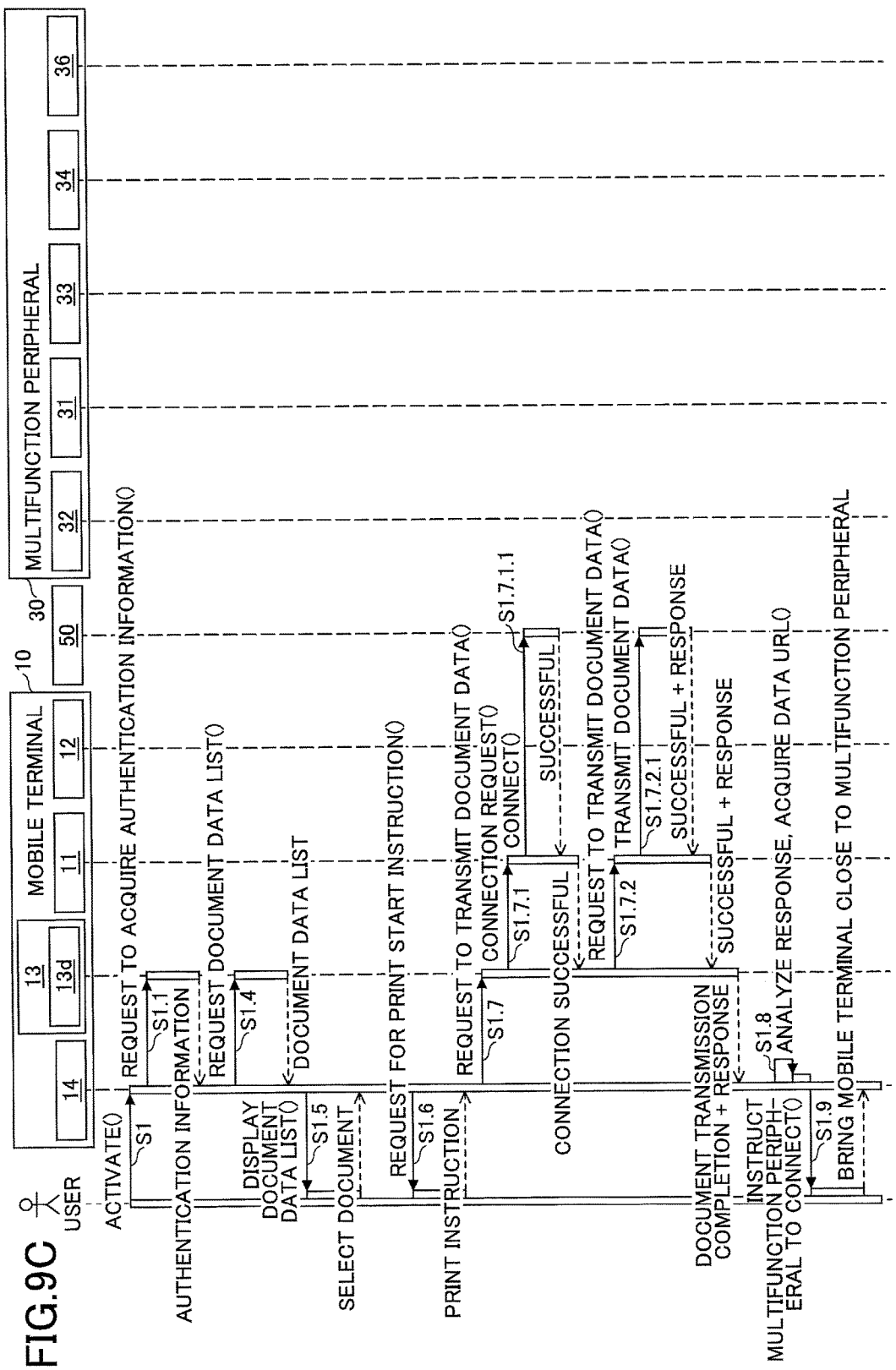

PLEASE INPUT ACCESS CONDITION TO CLOUD STORAGE:

512 —— ⦿ a. USE ONLY ADDRESS BEGINNING WITH FOLLOWING

513 —— ◯ b. DO NOT USE ADDRESS BEGINNING WITH FOLLOWING

514 ——

USE SEMICOLON (;) TO DIVIDE ENTRIES.

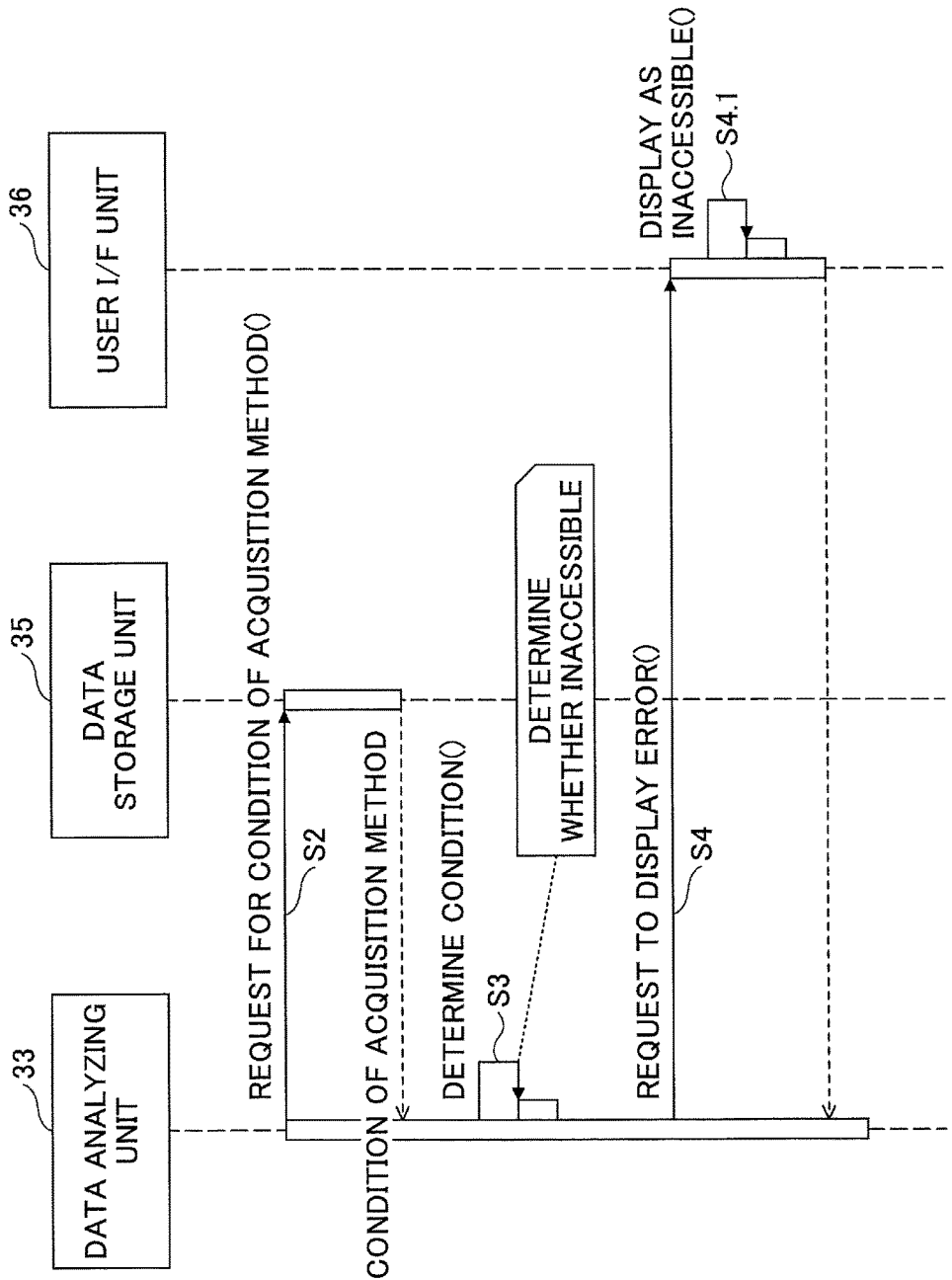

COMMUNICATION SYSTEM, MOBILE TERMINAL, AND DEVICE

CROSS-REFERENCE TO RELATED APPLICATION

The present application claims priority under 35 U.S.C. § 119 to Japanese Patent Application No. 2016-199385, filed on Oct. 7, 2016 and Japanese Patent Application No. 2017-171532, filed on Sep. 6, 2017, the contents of which are incorporated herein by reference in their entirety.

BACKGROUND OF THE INVENTION

1. Field of the Invention

The present invention relates to a communication system, a mobile terminal, and a device.

2. Description of the Related Art

A pull print service is implemented, in which document data is transmitted from a Personal Computer (PC), etc., to a print mediation server on the Internet, and the user gives an instruction to print the document data in the print mediation server by any multifunction peripheral.

Furthermore, there is also demand for a service of directly transmitting document data stored in a mobile terminal to a multifunction peripheral, for printing the document data. As a conceivable method of implementing such a service, a mobile terminal acquires connection information such as a service set identifier (SSID) and a password, etc., by short-range wireless communication, connects to a local network via a wireless local area network (LAN) (for example, wireless fidelity (Wi-Fi)), and transmits the document data to a multifunction peripheral in a network.

A printing method has been devised by combining the above methods, in which document data is transmitted from a mobile terminal to a print mediation server, and a multifunction peripheral acquires the document data from the print mediation server (see, for example, Patent Document 1). Patent Document 1 discloses a communication system in which file information of document data stored on the Internet, is transmitted to a multifunction peripheral by a short-range wireless device, and the multifunction peripheral acquires the document data on the Internet and prints the document data.

Patent Document 1: Japanese Unexamined Patent Application Publication No. 2015-32026

SUMMARY OF THE INVENTION

An aspect of the present invention provides communication system, a mobile terminal, and a device, in which one or more of the disadvantages of the related art are reduced.

According to one aspect of the present invention, there is provided a communication system including a mobile terminal; an information processing apparatus; and a device, wherein the mobile terminal and the information processing apparatus communicate with each other over a first communication network, the mobile terminal and the device communicate with each other over a second communication network, and the device and the information processing apparatus communicate with each other over a third communication network, wherein the mobile terminal includes a first processor, in communication with a first memory, executing a process including transmitting, by a first communication device, output data to be output by the device, to the information processing apparatus, the output data being transmitted to the information processing apparatus upon accepting an instruction via a user interface displayed on a display device of the mobile terminal; and transmitting, by a second communication device different from the first communication device, acquisition location specification information to the device, the acquisition location specification information specifying a location from which the output data is to be acquired by the device from the information processing apparatus, and wherein the device includes a second processor, in communication with a second memory, executing a process including receiving the acquisition location specification information from the mobile terminal; acquiring the output data from the information processing apparatus according to the acquisition location specification information; and outputting the output data.

BRIEF DESCRIPTION OF THE DRAWINGS

FIG. 9A is an example of a sequence diagram illustrating a procedure in which the mobile terminal communicates with the multifunction peripheral and the multifunction peripheral prints the document data according to an embodiment of the present invention;

FIG. 9B is the example of the sequence diagram illustrating the procedure in which the mobile terminal communicates with the multifunction peripheral and the multifunction peripheral prints the document data according to an embodiment of the present invention;

FIG. 9C is a modified example of a sequence diagram illustrating a procedure in which the mobile terminal communicates with the multifunction peripheral and the multifunction peripheral prints the document data according to an embodiment of the present invention;

FIG. 11 is a diagram illustrating an example of a screen for inputting conditions of the acquisition method according to an embodiment of the present invention; and FIG. 12 is an example of a sequence diagram illustrating a process performed by the multifunction peripheral when a condition of the acquisition method is not satisfied, according to an embodiment of the present invention.

DETAILED DESCRIPTION OF THE PREFERRED EMBODIMENTS

The communication system disclosed in Patent Document 1 has a problem that an exclusive-use print mediation server is required. That is, in order for the multifunction peripheral to acquire the document data from the Internet with the file information, the multifunction peripheral is required to hold, in advance, information indicating a communication method, etc., to be performed with the print mediation server, and an exclusive-use print mediation server is inevitably required.

A problem to be solved by an embodiment of the present invention is to provide a communication system that enables a device to acquire output data without an exclusive-use server.

As embodiments of the present invention, a communication system 100 and a communication performed by the communication system 100 will be described by referring to the accompanying drawings.

<Description of Overview of Operations>

Figure 1:
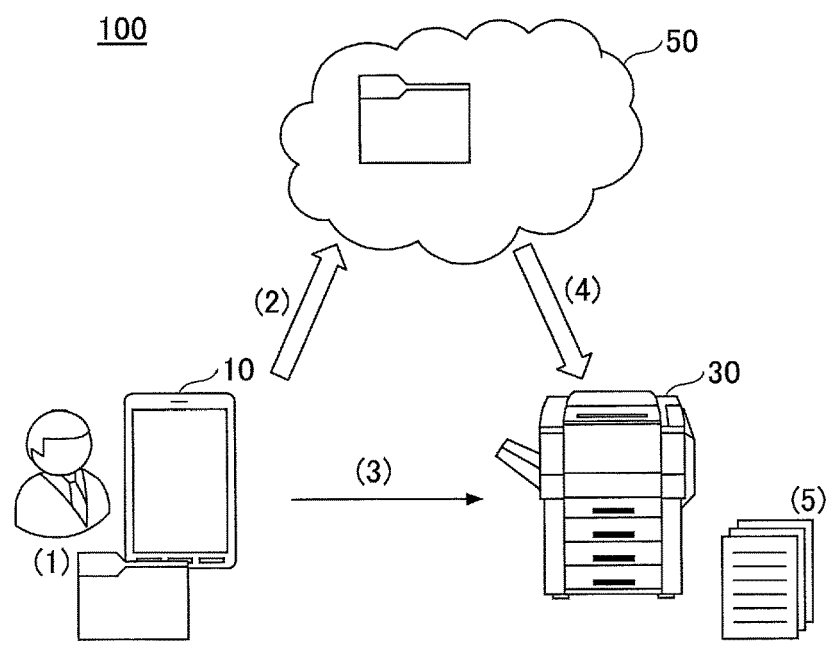
FIG. 1 is an example of a diagram for describing an overview of operations of a communication system according to an embodiment of the present invention.

FIG. 1 is an example of a diagram for describing an overview of operations of the communication system 100 according to the present embodiment. The user carries a mobile terminal 10, and the mobile terminal 10 includes a Subscriber Identity Module (SIM) card for connecting to a public line such, as a mobile phone network.

(1) The user operates the mobile terminal 10 to create and store document data to be printed.

(2) The mobile terminal 10 connects to the Internet via a public line and stores the document data in any cloud storage 50 that can be used by the user. Furthermore, the user can display a list of document data, read document data, and delete document data, etc. The cloud storage 50 is an online storage provided as a free or paid service.

(3) Furthermore, the mobile terminal 10 can communicate with a multifunction peripheral 30 by short-range wireless communication such as Bluetooth (registered trademark) or near field communication (NFC). The mobile terminal 10 transmits information indicating an acquisition method for acquiring the document data, to the multifunction peripheral 30, by using the short range wireless communication. The acquisition method is, for example, a Uniform Resource Locator (URL) and information for the cloud storage 50 to authenticate the user.

(4) The multifunction peripheral 30 is connected to the Internet via a network such as Ethernet (registered trademark). The multifunction peripheral 30 acquires the document data from the cloud storage 50 on the Internet by using the acquisition method for acquiring the document data.

(5) The multifunction peripheral 30 prints the document data.

As described above, one of the features of the communication system 100 according to the present embodiment is that the mobile terminal 10 stores, through a public line, the document data in the cloud storage 50 on the Internet that can be voluntarily used by the user. Furthermore, the mobile terminal 10 transmits the acquisition method for acquiring the document data by short-range wireless communication to the multifunction peripheral 30. Therefore, there is no need for a server to be exclusively used by the multifunction peripheral 30. Hardware (a communication interface (I/F) 107 to be described later) used by the mobile terminal 10 to connect to the Internet via a public line, is different from a short-range wireless communication device 109 to be described later to be used for connection with the multifunction peripheral 30. Therefore, the mobile terminal 10 can use the communication I/F 107 and the short-range wireless communication device 109 at the same time or in parallel.

In general, the mobile terminal 10 is unable to connect to the public line and the wireless LAN at the same time, and therefore after the mobile terminal 10 registers the document data via the public line, the user is required to operate the mobile terminal 10 to switch the connection from the public line to the wireless LAN, in order to connect to the wireless LAN to which the multifunction peripheral 30 and communicate with the multifunction peripheral 30. However, since short-range wireless communication is used in the present embodiment, after sending the document data to the cloud storage 50, the user does not have to switch to the connection with the wireless LAN in the present embodiment.

<Terms>

The output data is data to be subjected to an output process by a device such as a multifunction peripheral. The output process means converting the data into a format that is recognized, detected, or grasped from outside with respect to a device.

Furthermore, the data to be output is data created by word processing software, spreadsheet software, presentation software, or browser software, etc. Furthermore, the output data also includes data obtained by converting the data created by the software into a format processable by the multifunction peripheral 30, by using a printer driver, etc., at the mobile terminal 10.

As described above, the output data may be any kind of data that can be handled by the mobile terminal 10 and output. Examples are document data and image data, etc. In the present embodiment, document data will be described as an example.

Acquisition location specification information is information for specifying the acquisition location of the output data (the location from which the output data is to be acquired). For example, the acquisition location is a storage location of document data. Furthermore, the acquisition location specification information may include methods and means used by the multifunction peripheral 30 for acquiring document data from the cloud storage 50, and a communication method (communication protocol or Web Application Programming Interface (API)) may be included. Furthermore, the acquisition location specification information may include a user name and a password used by the cloud storage 50 for authenticating a user. In the present embodiment, the term "acquisition method" will be used to indicate the acquisition location specification information.

<System Configuration Example>

Figure 2:
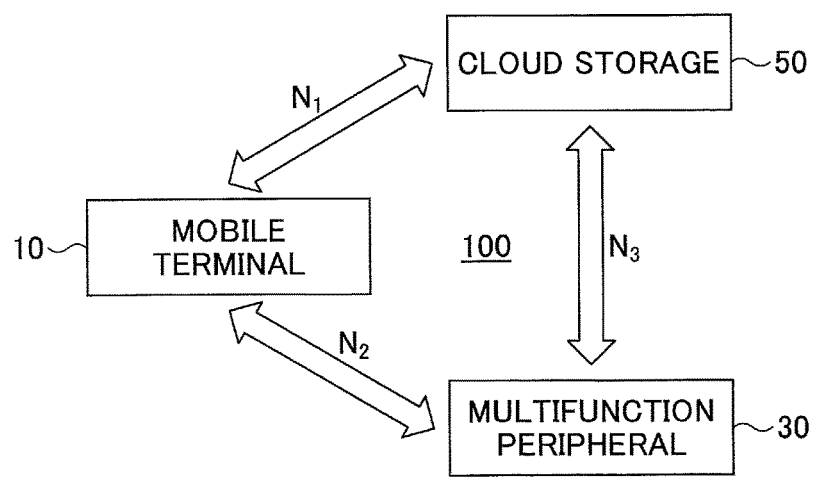
FIG. 2 is an example of a system configuration diagram of the communication system according to an embodiment of the present invention.

FIG. 2 is an example of a system configuration diagram of the communication system 100 according to the present embodiment. The communication system 100 includes the mobile terminal 10, the cloud storage 50, and the multifunction peripheral 30.

The mobile terminal 10 and the cloud storage 50 communicate via a network N1. The network N1 according to the present embodiment is a network using a public line such as Third Generation (3G), Fourth Generation (4G), or Long Term Evolution (LTE), etc. A public line is a line used by unspecified users physically sharing the same line, in a communication line connecting locations. Examples are a mobile phone network and a Personal Handyphone System (PHS) communication network. Note that the mobile terminal 10 can also connect to the access point via a wireless LAN such as Wi-Fi and communicate with the cloud storage 50 via the Internet.

The mobile terminal 10 and the multifunction peripheral 30 communicate with each other via a network N2. The network N2 according to the present embodiment is a network using short-range wireless communication such as NFC, Bluetooth (registered trademark), and Bluetooth (registered trademark) Low Energy, etc. Besides the above, any network that can be used at the same time as public line communication, such as infrared communication and visible light communication, may be used.

The multifunction peripheral 30 and the cloud storage 50 communicate with each other via a network N3. The network N3 according to the present embodiment is constructed by a LAN constructed in a facility, etc., where the multifunction peripheral 30 is installed, a provider network of a provider connecting a LAN to the Internet, and a line provided by a line operator, etc. When the network N3 includes a plurality of LANs, the network N3 is referred to as a wide area network (WAN) or the Internet. The network N3 may be either wired or wireless, or a combination of wired and wireless lines. Furthermore, when the multifunction peripheral 30 directly connects to the public line network, the multifunction peripheral 30 can connect to the provider network without involving the LAN.

The mobile terminal 10 functions as an information processing apparatus, and application software (hereinafter simply referred to as an "application") to be described later, is operating in the mobile terminal 10. The application includes functions of supporting the user's creation of document data, registering document data in the cloud storage 50, and acquiring (downloading) the document data to edit or delete the document data. The mobile terminal 10 also has a function of causing the multifunction peripheral 30 to print the document data stored in the cloud storage 50. Specifically, the mobile terminal 10 is, for example, a smartphone, a mobile phone, a tablet terminal, a game console, a Personal Digital Assistant (PDA), a digital camera, wearable Personal Computer (PC), and a notebook PC, etc.; however, the mobile terminal 10 is not limited as such.

The cloud storage 50 is a storage on the Internet. The cloud storage 50 can also be referred to as a storage used in services that provide users with disk space on the Internet. Other than the cloud storage 50, there are cases where the storage is referred as an online storage. The cloud storage 50 can be used by general users and companies. In the case of a company, a file server environment does not have to be constructed in-house, and the storage capacity can be increased or decreased by a required amount. Furthermore, document data in the cloud storage 50 can be stored or acquired by the mobile terminal 10 or the multifunction peripheral 30 that accessed the cloud storage 50 via the Internet.

The cloud storage 50 has a large capacity storage, but in general, the cloud storage 50 has a function of an information processing apparatus, in addition to a storage function. Furthermore, cloud is a term used when a specific hardware resource is not intended. The cloud storage 50 does not need to be housed in one casing or provided as a single unit, but is configured by dynamically connecting and disconnecting hardware resources according to the load. Furthermore, the cloud storage 50 may be constructed in a virtual environment within one information processing apparatus, or may be constructed across a plurality of information processing apparatuses.

The multifunction peripheral 30 is an apparatus referred to as an image forming apparatus and a printer, etc.; however, in the present embodiment, the multifunction peripheral 30 may suffice as long as a printer function is included. However, the multifunction peripheral 30 may have one or more functions among a fax function, a scanner function, and a copy function. Furthermore, the multifunction peripheral 30 may be referred to as a copying machine, a copier, and office equipment, etc.

Furthermore, the multifunction peripheral 30 may be a device having a function of outputting document data, in addition to the printer function. Examples are a facsimile apparatus, a projector, a head up display (HUD) apparatus, an electronic blackboard, and a digital signage, etc. In the case of these devices, the device performs fax transmission, projection, or display with respect to the document data acquired from the cloud storage 50.

<Hardware Configuration>

«Hardware of Mobile Terminal 10»

Figure 3:
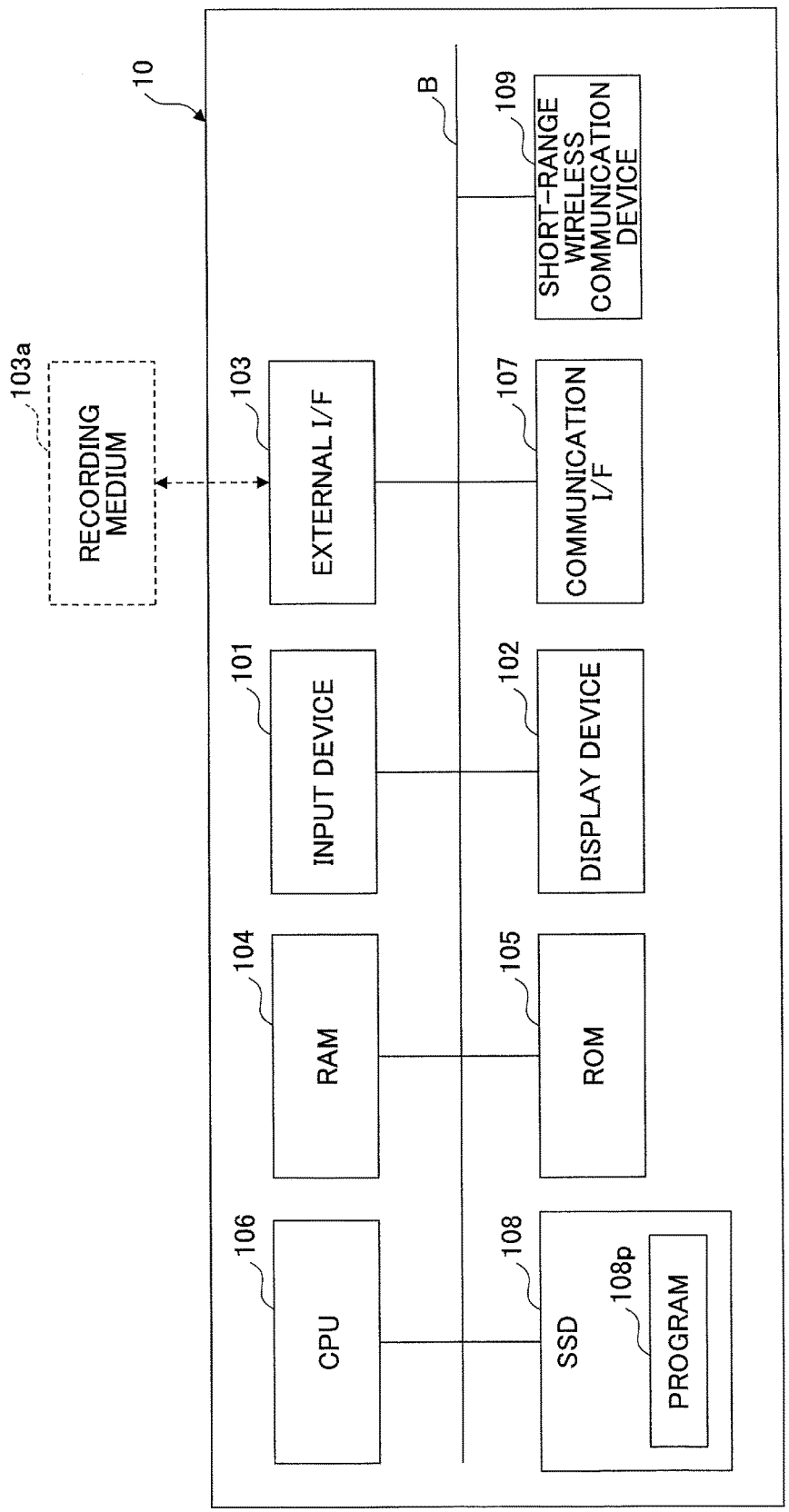
FIG. 3 is a hardware configuration diagram of an example of a mobile terminal according to an embodiment of the present invention.

The mobile terminal 10 according to the present embodiment is implemented by a hardware configuration as illustrated in FIG. 3, for example. FIG. 3 is a hardware configuration diagram of an example of the mobile terminal 10 according to the present embodiment. The mobile terminal 10 illustrated in FIG. 3 includes an input device 101, a display device 102, an external I/F 103, a Random Access Memory (RAM) 104, a Read-Only Memory (ROM) 105, a Central Processing Unit (CPU) 106, the communication I/F 107, a Solid State Drive (SSD) 108, and the short-range wireless communication device 109, etc., which are interconnected via a bus B.

The input device 101 is, for example, a touch panel, and is used for inputting operation signals to the mobile terminal 10. Note that the input device 101 may be a keyboard and a mouse, etc. The display device 102 is, for example, a Liquid Crystal Display (LCD), etc., and displays processing results obtained by the mobile terminal 10.

The external I/F 103 is an interface with respect to an external device. The external device includes a recording medium 103a, etc. A Universal Serial Bus (USB) cable and the recording medium 103a, etc., are connected to the external I/F 103. A program for implementing the display method according to the present embodiment may be stored in the recording medium 103a. The mobile terminal 10 can read and/or write in the recording medium 103a via the external I/F 103.

The recording medium 103a is, for example, a Secure Digital (SD) memory card. The recording medium 103a may be, for example, a Universal Serial Bus (USB) memory, a Digital Versatile Disk (DVD), a Compact Disk (CD), and a flexible disk, etc.

The RAM 104 is a volatile semiconductor memory (storage device) that temporarily holds programs and data. The ROM 105 is a non-volatile semiconductor memory (storage device) capable of holding programs and data even when the power is turned off. The ROM 105 stores programs and data such as Basic Input/Output System (BIOS) that is executed when the mobile terminal 10 is activated, an Operating System (OS) setting, and a network setting, etc.

The CPU 106 is an arithmetic device that implements control and functions of the entire mobile terminal 10, by loading programs and data from a storage device such as the ROM 105 and the SSD 108 into the RAM 104, and executing processes.

The communication I/F 107 is an interface for performing communication via the network N. For example, the communication I/F 107 is an interface for the mobile terminal 10 to connect to the cloud storage 50 via the network N1. That is, the communication I/F 107 is an interface for connecting to the Internet via the public network.

The SSD 108 is a non-volatile storage device that stores a program 108p and data. The stored program 108p and data include, for example, an OS which is basic software for controlling the entire mobile terminal 10, and applications that provide various functions on the OS, etc. The SSD 108 manages the stored programs and data by a predetermined file system and/or a DB (database). Note that the mobile terminal 10 may be provided with a Hard Disk Drive (HDD), etc., instead of the SSD 108 or in combination with the SSD 108.

The short-range wireless communication device 109 is a communication device according to the communication standard such as NFC or Bluetooth (registered trademark), for example. For example, in the case of NFC, the short-range wireless communication device 109 may be referred to as a reader/writer. Thus, the mobile terminal 10 can perform data communication with the multifunction peripheral 30 via the short-range wireless communication device 109.

The mobile terminal 10 according to the present embodiment can implement various kinds of processes with the above hardware configuration, as will be described later.

«Hardware of Multifunction Peripheral 30»

Figure 4:
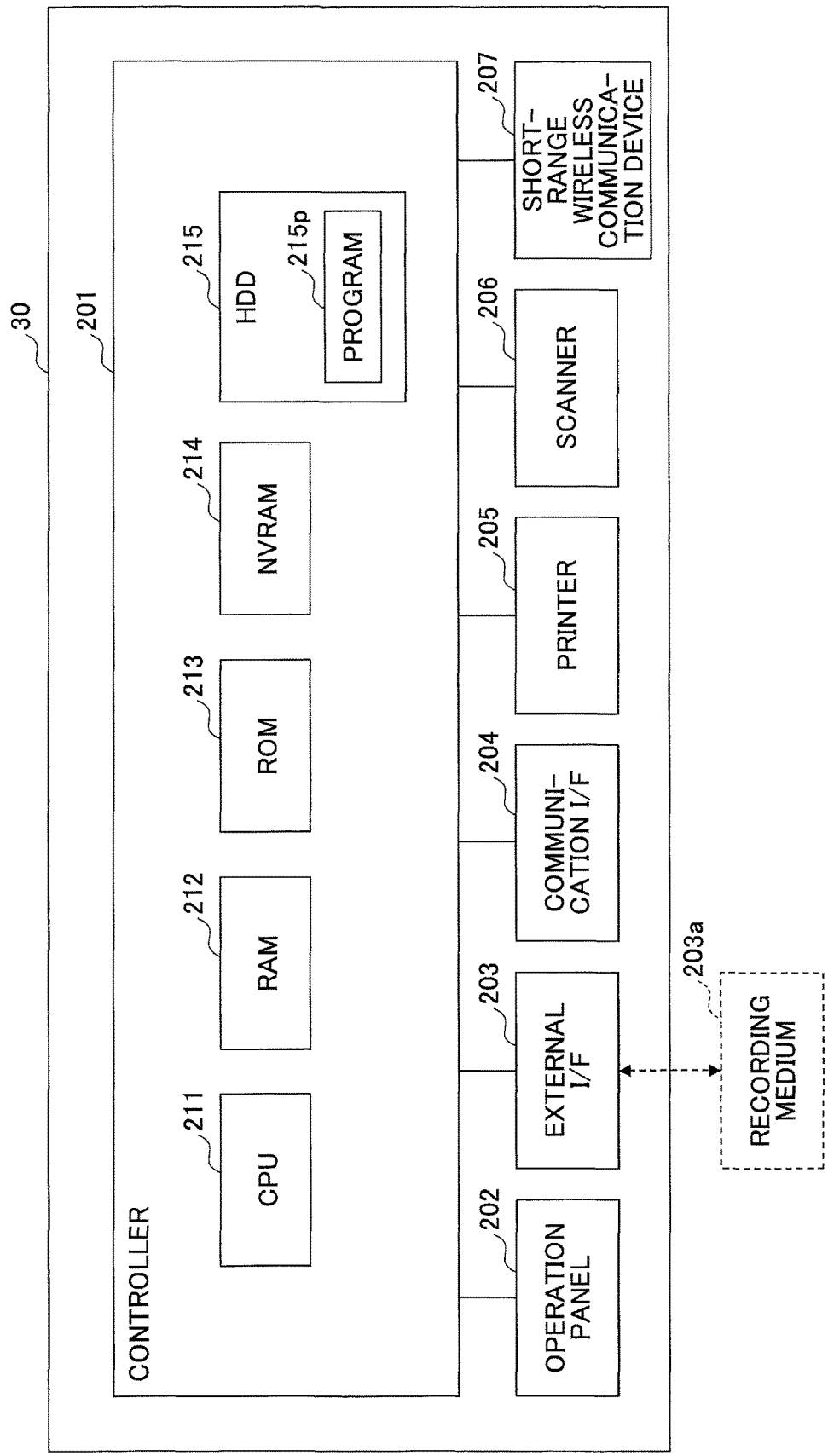
FIG. 4 is a hardware configuration diagram of an example of a multifunction peripheral according to an embodiment of the present invention.

The multifunction peripheral 30 according to the present embodiment is implemented by a hardware configuration as illustrated in FIG. 4, for example. FIG. 4 is a hardware configuration diagram of an example of the multifunction peripheral 30 according to the present embodiment. The multifunction peripheral 30 illustrated in FIG. 4 includes a controller 201, an operation panel 202, an external I/F 203, a communication I/F 204, a printer 205, a scanner 206, and a short-range wireless communication device 207, etc.

The controller 201 includes a CPU 211, a RAM 212, a ROM 213, a non-volatile random access memory (NVRAM) 214, and an HDD 215. The ROM 213 stores various programs and data. The RAM 212 temporarily holds programs and data. The NVRAM 214 stores, for example, setting information, etc. Furthermore, the HDD 215 stores various programs 215p and data.

The CPU 211 loads the program 215p, data, and setting information, etc., from the ROM 213, the NVRAM 214, and the HDD 215, etc., into the RAM 212, and executes processes, thereby implementing control and functions of the entire multifunction peripheral 30.

The operation panel 202 includes an input unit for accepting input from the user and a display unit (including a touch panel) for displaying information. The external I/F 203 is an interface with respect to an external device. The external device includes a recording medium 203a, etc. Note that the recording medium 203a includes a flexible disk, a CD, a DVD, an SD memory card, and a USB memory, etc.

The communication I/F 204 is an interface for performing communication via the network N3. In the present embodiment, the communication I/F 204 connects to the cloud storage 50 via the network N3.

The printer 205 is a printing device for printing and outputting print target data. The scanner 206 is a reading device that optically reads an original document and converts the information read from the original document into electronic data.

The short-range wireless communication device 207 is a communication device according to the communication standard of NFC or Bluetooth (registered trademark), for example. For example, in the case of NFC, the short-range wireless communication device 207 is sometimes referred to a reader/writer, etc. Thus, the multifunction peripheral 30 can perform data communication with the mobile terminal 10 via the short-range wireless communication device 207.

The multifunction peripheral 30 according to the present embodiment can implement various processes as described later with the hardware configuration described above.

«Hardware of Cloud Storage 50»

Figure 5:
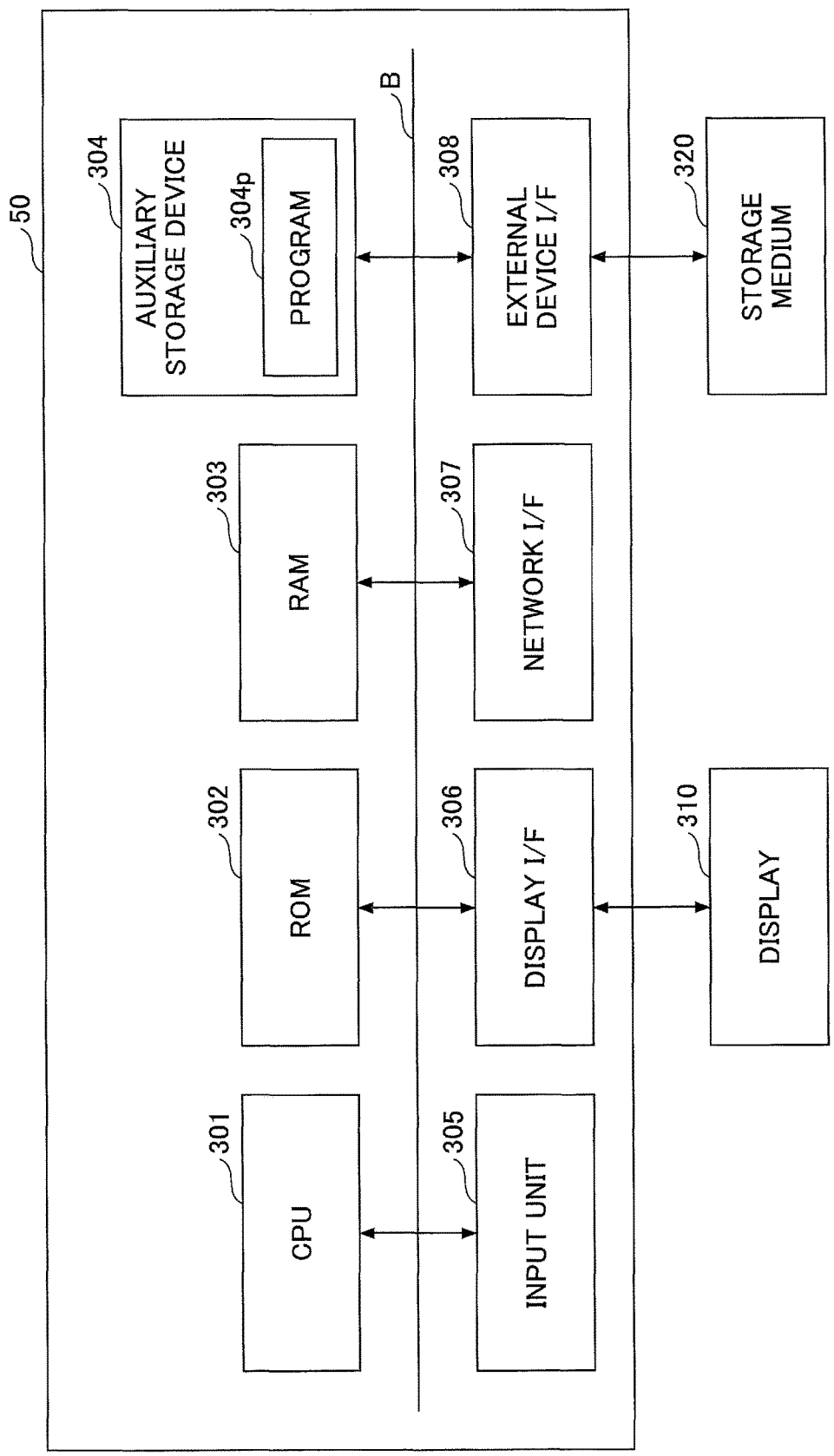
FIG. 5 is an example of a hardware configuration diagram of a cloud storage according to an embodiment of the present invention.

FIG. 5 is an example of a hardware configuration diagram of the cloud storage 50 according to the present embodiment. The cloud storage 50 includes a CPU 301, a ROM 302, a RAM 303, and an auxiliary storage device 304. Furthermore, the cloud storage 50 includes an input unit 305, a display I/F 306, a network I/F 307, and an external device I/F 308. Note that the respective units of the cloud storage 50 are interconnected via a bus B. Therefore, the cloud storage 50 has a function of an information processing apparatus.

The CPU 301 executes various programs 304p, and an OS, etc., stored in the auxiliary storage device 304. The ROM 302 is a non-volatile memory. The ROM 302 stores a system loader and data, etc.

The RAM 303 is a main storage device such as Dynamic Random Access Memory (DRAM) or Static Random Access Memory (SRAM). When executed by the CPU 301, the program 304p stored in the auxiliary storage device 304 is loaded in the RAM 303, and the RAM 303 serves as a work area of the CPU 301.

The auxiliary storage device 304 stores the programs 304p executed by the CPU 301 and various databases used when the programs 304p are executed by the CPU 301. The auxiliary storage device 304 is a non-volatile memory such as a HDD or a SSD, for example.

The input unit 305 is an interface used by an operator to input various instructions to the cloud storage 50. For example, the input unit 305 includes a keyboard, a mouse, a touch panel, and a voice sound input device, etc. However, the input unit 305 may be connected according to need.

The display I/F 306 displays, on a display 310, various kinds of information included in the cloud storage 50, in the form of a cursor, a menu, a window, a character, and an image, etc., in accordance with a request from the CPU 301. The display I/F 306 is, for example, a graphic chip or a display I/F. However, the display I/F 306 may be connected according to need.

The network I/F 307 is a communication device that communicates with the mobile terminal 10 and the multifunction peripheral 30 via a network. The network I/F 307 is, for example, an Ethernet (registered trademark) card; however, the network I/F 307 is not limited as such.

The external device I/F 308 is an interface for connecting a USB cable or various storage media 320 such as a USB memory.

<Functions of Communication System 100>

Figure 6:
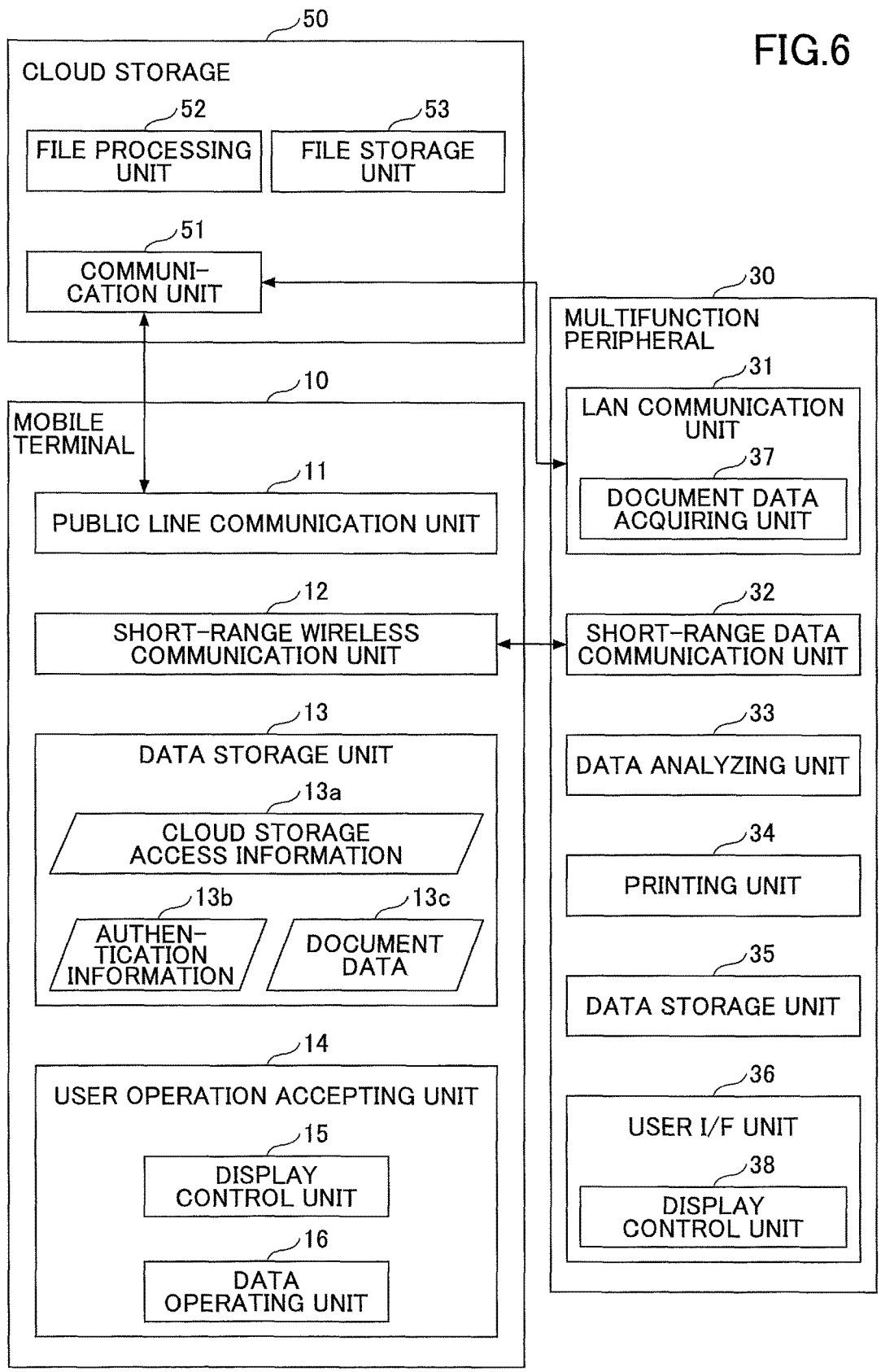
FIG. 6 is an example of a functional block diagram of the mobile terminal, the multifunction peripheral, and the cloud storage included in the communication system according to an embodiment of the present invention.

FIG. 6 is an example of a functional block diagram of the mobile terminal 10, the multifunction peripheral 30, and the cloud storage 50 included in the communication system 100.

«Functions of Mobile Terminal 10»

The mobile terminal 10 includes a public line communication unit 11, a short-range wireless communication unit 12, a data storage unit 13, and a user operation accepting unit 14. Each of these functional units included in the mobile terminal 10 is a function or a means implemented by one or more of the constituent elements illustrated in FIG. 3 being operated according to an instruction from the CPU 106 in accordance with the program 108p loaded into the RAM 104 from the SSD 108. The programs 108p include an application compatible with the communication system 100.

The public line communication unit 11 is implemented as the CPU 106 illustrated in FIG. 3 executes the program 108p and controls the communication I/F 107, etc. The public line communication unit 11 is connected to a public line (3G/4G/LTE, etc.) to communicate with the cloud storage 50.

The short-range wireless communication unit 12 is implemented as the CPU 106 illustrated in FIG. 3 executes the program 108p and controls the short-range wireless communication device 109, etc. The short-range wireless communication unit 12 communicates with the multifunction peripheral 30 by short-range wireless communication (NFC/Bluetooth (registered trademark)/Bluetooth (Registered trademark) LE, etc.).

Furthermore, the user operation accepting unit 14 is implemented as the CPU 106 illustrated in FIG. 3 executes the program 108p and controls the input device 101. The user operation accepting unit 14 accepts, from the user, input of cloud storage access information to be described later, a selection of the cloud storage 50, a selection of printing document, and instructions such as start printing, etc.

The user operation accepting unit 14 includes a display control unit 15 and a data operating unit 16. The display control unit 15 is implemented as the CPU 106 illustrated in FIG. 3 executes the program 108p and controls the display device 102, etc. The display control unit 15 generates and displays a screen to be a user interface (UI).

The data operating unit 16 is implemented as the CPU 106 illustrated in FIG. 3 executes the program 108p, etc. In accordance with an instruction from the user accepted by the user operation accepting unit 14, the data operating unit 16 analyzes the cloud storage access information and generates information for accessing the cloud storage 50, based on the operation accepted by the user operation accepting unit 14. Furthermore, the data operating unit 16 stores the cloud storage access information and the authentication information in the data storage unit 13. Also, the data operating unit 16 performs operations with respect to document data, such as creating a document, editing a document, storing a document, and deleting a document, etc.

The data storage unit 13 is implemented as the CPU 106 illustrated in FIG. 3 executes the program 108p, and by the RAM 104 or the SSD 108, etc. The data storage unit 13 stores cloud storage access information 13a, authentication information 13b, and document data 13c. Among these pieces of information, the document data 13c is data of a document created by the user operating the application or data acquired from the Internet, etc. Furthermore, the authentication information 13b is information used by the user to log into the multifunction peripheral 30, and is a user name (or a user ID) and a password as described later. When the multifunction peripheral 30 does not request the user to log in, the authentication information 13b is not required. An example of the cloud storage access information 13a is indicated in Table 1.

TABLE 1

| CLOUD STORAGE ID | 12345 |
|---|---|
| URL | https:// |
| USER NAME | Ichiro |
| PASSWORD | ***** |

Table 1 indicates an example of the cloud storage access information 13a in the form of a table. The cloud storage access information 13a is information used by the mobile terminal 10 or the multifunction peripheral 30 to access the cloud storage 50. As an example, the cloud storage access information 13a includes a cloud storage ID, a URL, a user name, and a password. The cloud storage ID is information for identifying the cloud storage 50 and can also be referred to as information for uniquely identifying the cloud storage 50. Note that an ID is a combination of names, codes, character strings, numerical values, etc., used for uniquely distinguishing a specific target from among a plurality of targets. The ID is sometimes referred to as identification information.

The URL is information indicating the location of resources such as files and services accessible on the network, and a communication method. The URL may include address information indicating the location of the resource. In the present embodiment, the URL indicates the storage location of document data. The user name and the password are information used by the user to receive authentication from the cloud storage 50.

«Functions of Multifunction Peripheral 30»

Next, the multifunction peripheral 30 includes a LAN communication unit 31, a short-range data communication unit 32, a data analyzing unit 33, a printing unit 34, a data storage unit 35, and a user I/F unit 36. Each of these functional units of the multifunction peripheral 30 is a function or a means implemented by one or more of the constituent elements illustrated in FIG. 4 being operated according to an instruction from the CPU 211 in accordance with a program loaded into the RAM 212 from the HDD 215.

The LAN communication unit 31 is implemented as the CPU 211 illustrated in FIG. 4 executes a program 215p and controls the communication I/F 204, etc. The LAN communication unit 31 connects to the LAN (either wired or wireless) to communicate with the cloud storage 50. That is, the LAN communication unit 31 connects to the Internet.

The LAN communication unit 31 includes a document data acquiring unit 37. The document data acquiring unit 37 is implemented as the CPU 211 illustrated in FIG. 4 executes the program 215p, etc. The document data acquiring unit 37 acquires the document data from the cloud storage 50 by using the URL, etc., analyzed and acquired by the data analyzing unit 33.

The short-range data communication unit 32 is implemented as the CPU 211 illustrated in FIG. 4 executes the program 215p and controls the short-range wireless communication device 207, etc. The short-range data communication unit 32 performs communication by short-range wireless communication (NFC/Bluetooth (registered trademark)/Bluetooth (Registered trademark) LE, etc.). That is, the short-range data communication unit 32 communicates with the mobile terminal 10 to acquire the cloud storage access information 13a.

The data analyzing unit 33 is implemented as the CPU 211 illustrated in FIG. 4 by executes the program 215p, etc. The data analyzing unit 33 analyzes the cloud storage access information 13a received by the short-range data communication unit 32, creates a URL and data URL, and gives an instruction to the document data acquiring unit 37.

The printing unit 34 is implemented as the CPU 211 illustrated in FIG. 4 executes the program 215p and controls the printer 205. The printing unit 34 prints the document data acquired by the document data acquiring unit 37.

The user I/F unit 36 is implemented as the CPU 211 illustrated in FIG. 4 executes the program 215*p* and controls the operation panel 202, etc. The user I/F unit 36 provides an interface with the user, and accepts an operation from the user. The user I/F unit 36 includes a display control unit 38. The display control unit 38 displays a screen requesting the user to input a condition with respect to the acquisition method. Also, the display control unit 38 displays errors and other statuses until printing is completed. The condition with respect to the acquisition method is a condition regarding whether the document data is to be acquired by the multifunction peripheral 30.

The data storage unit 35 is implemented as the CPU 211 illustrated in FIG. 4 executes the program 215*p*, and by the RAM 212, the ROM 213, and the HDD 215, etc. The data storage unit 35 stores the cloud storage access information 13*a* and the document data.

«Functions of Cloud Storage 50»

The cloud storage 50 includes a communication unit 51, a file processing unit 52, and a file storage unit 53. Each of these functional units included in the cloud storage 50 is a function or a means implemented by one or more of the constituent elements illustrated in FIG. 5 being operated according to an instruction from the CPU 301 in accordance with a program loaded from the auxiliary storage device 304 into the RAM 303.

The communication unit 51 is implemented as the CPU 301 illustrated in FIG. 5 executes a program and controls the network I/F 307, etc. The communication unit 51 exchanges various kinds of data with the mobile terminal 10 and the multifunction peripheral 30. Since the communication unit 51 is connected to a LAN, etc., there is no need to connect to the public line when communicating with the mobile terminal 10.

The file processing unit 52 is implemented as the CPU 301 illustrated in FIG. 5 by executes a program, etc. The file processing unit 52 stores the document data received from the mobile terminal 10 in the file storage unit 53, and reads, from the file storage unit 53, a file requested from the multifunction peripheral 30.

The file storage unit 53 is implemented by the RAM 303 and the auxiliary storage device 304, etc., illustrated in FIG. 5. The file storage unit 53 stores various files including document data.

<Operation Procedure>

Figure 7:
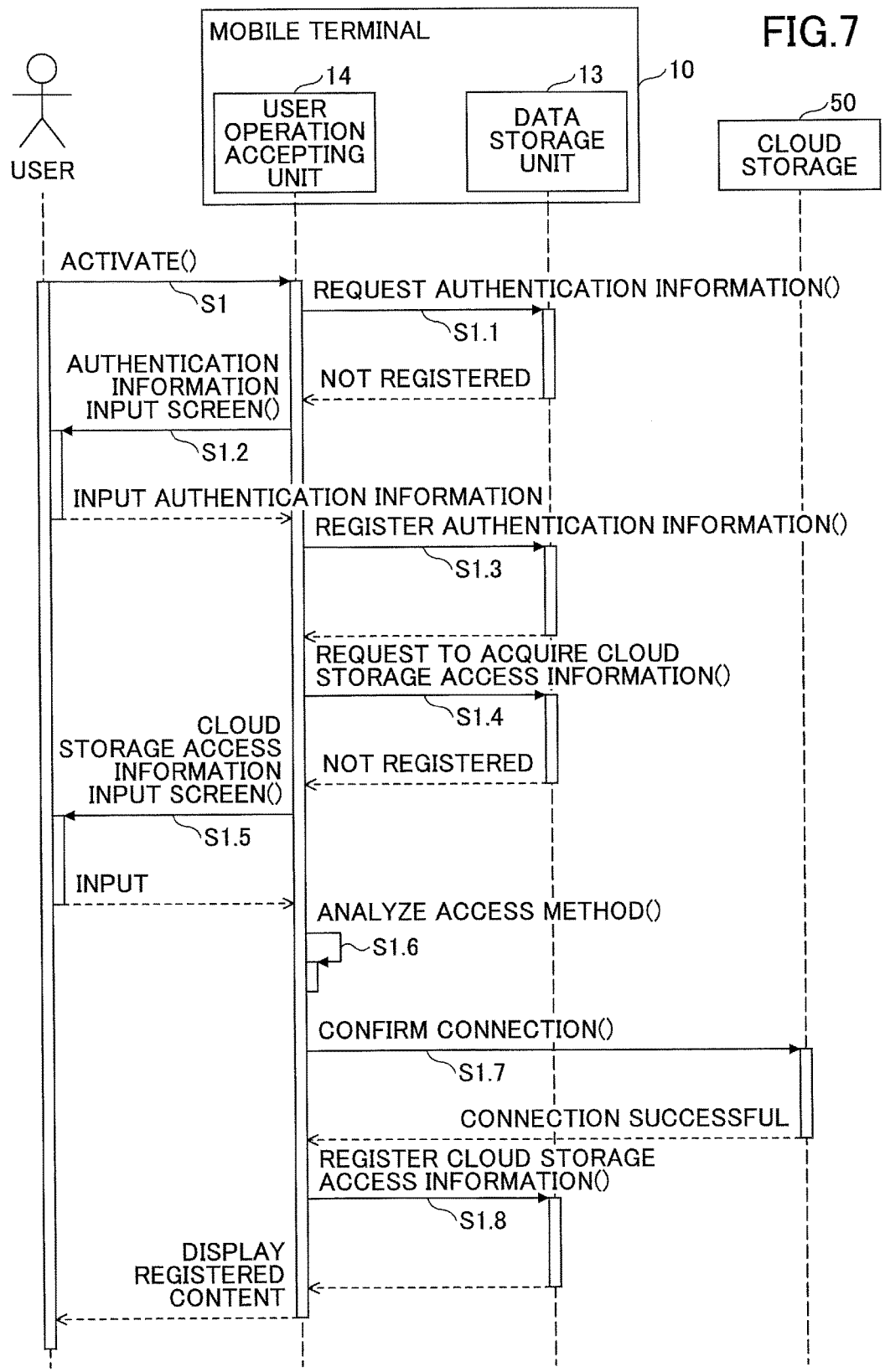
FIG. 7 is an example of a sequence diagram illustrating a procedure in which the mobile terminal registers document data in the cloud storage according to an embodiment of the present invention.
Figure 8:
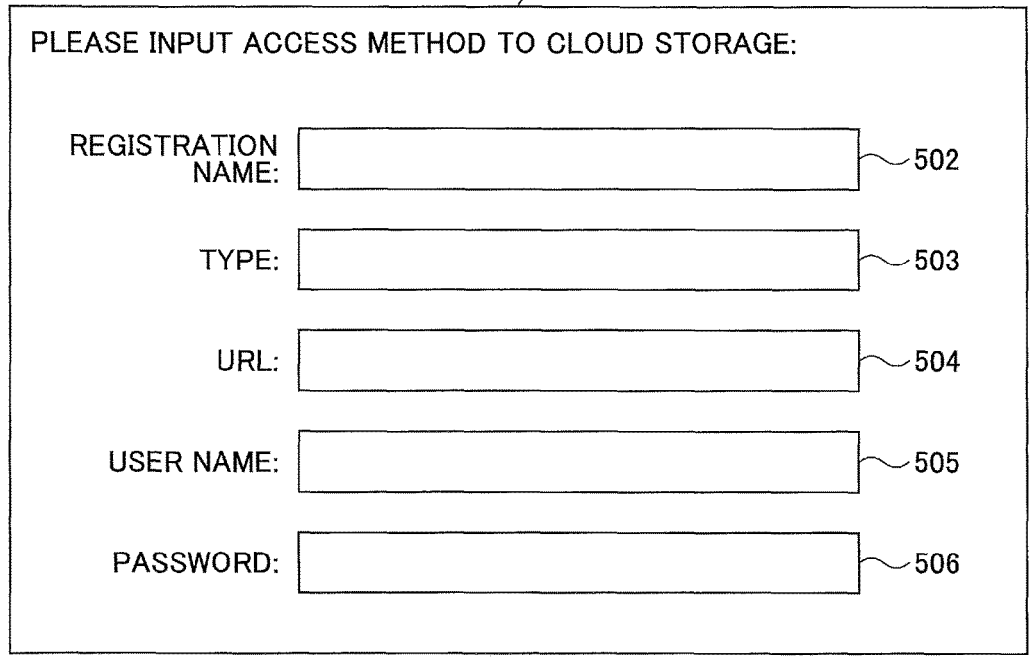
FIG. 8 illustrates an example of an access information input screen displayed on a display device of the mobile terminal according to an embodiment of the present invention.

With reference to FIGS. 7 and 8, a method of registering document data in the cloud storage 50 by the mobile terminal 10 will be described. FIG. 7 is an example of a sequence diagram illustrating a procedure in which the mobile terminal 10 registers document data in the cloud storage 50. FIG. 8 illustrates an example of an access information input screen displayed on the display device 102 of the mobile terminal 10.

Step S1: The user operates the mobile terminal 10 to activate the program 108*p* (application) on the mobile terminal 10.

Step S1.1: The user operation accepting unit 14 of the activated application sends a query to the data storage unit 13, as to whether authentication information 13*b* used by the multifunction peripheral 30 to authenticate the user, is registered. Since the authentication information 13*b* is not registered in the mobile terminal 10 at the time of the initial activation, the user operation accepting unit 14 determines that the authentication information 13*b* is not yet registered.

Step S1.2: Since the authentication information 13*b* is not yet registered, the display control unit 15 of the user operation accepting unit 14 displays, on the display device 102, a screen for inputting the authentication information 13*b*. The user inputs a user name and a password, etc., according to instructions on this screen.

Step S1.3: Upon completion of the input from the user, the user operation accepting unit 14 registers the input authentication information in the data storage unit 13. Accordingly, the authentication information 13*b* is stored in the data storage unit 13.

Step S1.4: Next, the user operation accepting unit 14 requests the data storage unit 13 to acquire the registered cloud storage access information 13*a*. Since the cloud storage access information 13*a* is not registered at the time of the initial activation, the user operation accepting unit 14 determines that the cloud storage access information 13*a* is not yet registered.

Step S1.5: Since the cloud storage access information 13*a* is not yet registered, the display control unit 15 of the user operation accepting unit 14 displays an access information input screen 501 on the display device 102, for inputting the cloud storage access information 13*a*. The user inputs a cloud storage ID, a URL, a user name, and a password, etc., according to instructions on the access information input screen 501.

Step S1.6: The user operation accepting unit 14 accepts the cloud storage access information 13*a*, and the data operating unit 16 analyzes the access method to the cloud storage 50. For example, the data operating unit 16 confirms the communication method (mainly communication protocol) from "type", acquires the "URL", and determines the data URL from this URL.

Step S1.7: The user operation accepting unit 14 confirms whether connection to the cloud storage 50 can be actually made by using the cloud storage access information 13*a* input by the user. That is, the public line communication unit 11 communicates with the cloud storage 50 by using the communication method, the "URL", and the data URL. Here, it is assumed that the connection is successful.

Step S1.8: When the connection is successful, the data operating unit 16 of the user operation accepting unit 14 registers the cloud storage access information 13*a* in the data storage unit 13. In this way, it is possible to register the cloud storage access information 13*a* after confirming whether connection is actually possible.

Note that when the connection is not successful in step S1.7, the user operation accepting unit 14 prompts the user to input the cloud storage access information 13*a* again.

«Access Information Input Screen»

In the access information input screen 501 illustrated in FIG. 8, a registration name (a name by which the user himself can be distinguished) 502 to be used when the user selects the cloud storage 50, a type 503 of the cloud storage, a URL 504 indicating the storage location, a user name input field 505 required when accessing the cloud storage, and a password input field 506 are displayed. Hereinafter, setting contents for each cloud storage 50 will be described.

FTP (File Transfer Protocol) Server

As an example of the cloud storage 50, an FTP server is known. The FTP server is a server that communicates with the client by using a communication protocol referred to as FTP. The setting contents in this case are as follows.

Registered name: ABC FTP site (file)
Type: FTP
URL: ftp://ftp.ABC.co.jp/public/printdata/mydata.dat
User name: user01
Password: password01

In this case, the data operating unit 16 can analyze that communication will be performed by "FTP" based on the "type", and since the resource specified by the URL is the file (mydata.dat), the data operating unit 16 determines to use this file as the cloud storage 50. In this case, the file name that the mobile terminal 10 transmits to the cloud storage 50, is the specified file name (mydata.dat). In the case where the information specified by the URL is a file as described above, the URL specifying the data is referred to as "data URL".

On the other hand, when the URL is registered as follows, the folder becomes the cloud storage 50.
URL: ftp://ftp.ricoh.co.jp/public/printdata/

In this case, the resource specified by the URL is a folder, so a file is not registered. In this case, the data operating unit 16 sets the specified folder as the cloud storage 50, and assigns a unique file name to each document data item. Therefore, in this case, the data operating unit 16 creates the data URL. Each file name is unique, and therefore the mobile terminal 10 can handle a plurality of files at the same time. As a process of handling a plurality of files (performing printing processes at the same time), there is a method in which the data operating unit 16 generates a plurality of data URLs specifying the respective unique file names, in the acquisition of the data URL of step S1.8 in FIG. 9A to be described later, and reporting the generated data URLs to the multifunction peripheral 30. Furthermore, in another method, in the same step S1.8 in FIG. 9A, the data operating unit 16 sets the URL per se as the data URL, and reports the data URL to the multifunction peripheral 30, and in step S3 of FIG. 9B, the multifunction peripheral 30 makes a request to receive all of the data items included in this folder.

Web-Based Distributed Authoring and Versioning (WebDAV) Server

A WebDAV server is known as an example of the cloud storage 50. A WebDAV server is a server that communicates with a client by using a communication protocol referred to as WebDAV. The setting contents in this case are as follows.
Registered name: ABC WebDAV site
Type: WebDAV
URL:
http://webDAV.ABC.co.jp/public/printdata/mydata.dat
User name: user01
Password: password01

In this case, since the data operating unit 16 can recognize that WebDAV is used from "type", the data operating unit 16 accesses the cloud storage 50 with the WebDAV protocol. Furthermore, since the location of the file serving as the storage can be known from the URL, the data operating unit 16 uses the file as the cloud storage 50. In this case also, mydata.dat is the data URL.

Storage Service of Google (Registered Trademark, Omitted Hereafter)

This is a storage service provided by Google Inc. This storage service is known as a service that a general user can store files of himself or a group.
Registered name: Google Drive user01
Type: Google Drive
URL:
https://drive.google.com/drive/folders/01234abcde
User name: user01
Password: password01

In this case, the data operating unit 16 can recognize that the storage is a Google Drive from "type". Furthermore, the data operating unit 16 determines to use a specific folder of the Google Drive, from the contents of the URL. "01234 abcde" is a folder, and therefore the data operating unit 16 determines the data URL; however, the data URL of the Google Drive is determined at the time of file registration. Details will be described with reference to FIGS. 9A through 9C.

Since the "type" is "Google Drive", the data operating unit 16 determines to access the cloud storage 50 by using a Web API such as REST I/F. That is, the data operating unit 16 holds the correspondence between cloud storage services such as Google Drive and the Web APIs, in a table, etc. A Web API is a procedure or a rule for invoking a certain program via the Internet. Furthermore, REpresentational State Transfer (REST) is an invoking interface that requests data to a server, etc. Generally, when an access is made by a Hypertext Transfer Protocol (HTTP) method (POST/GET, etc.), a message described in an Extensible Markup Language (XML) is transmitted. REST is used because REST is recommended by the Google Drive; REST is not essential for the cloud storage 50.

As described above, according to the cloud storage access information 13a input by the user, the data operating unit 16 can determine the access method for accessing the cloud storage 50. That is, the data operating unit 16 determines the communication method such as the communication protocol and the Web API, by the type of the cloud storage access information 13a, determines the communication destination with the URL, and determines the desired file with the data URL. There are general methods such as FTP and WebDAV, and there are methods requiring proprietary Web API such as GoogleDrive/Evernote/Dropbox etc.; however, by making determinations as described above, the mobile terminal 10 can access the cloud storage 50.

Note that the cloud storage access information 13a is not limited to the above. In addition to the above, the cloud storages 50 such as BOX.net and Yahoo Box (registered trademark), etc., are known. There is also the cloud storage 50 that can store data by sending an e-mail, and an input screen suitable for such a mail format may be prepared by an application.

<Operation Procedure when Printing>

Next, with reference to FIGS. 9A through 9C, the operation by the communication system 100 when the user uses the mobile terminal 10 to cause the multifunction peripheral 30 to print the document data, will be described. FIGS. 9A and 9B are an example of a sequence diagram illustrating a procedure in which the mobile terminal 10 communicates with the multifunction peripheral 30 and the multifunction peripheral 30 prints the document data.

Step S1: The user activates the application on the mobile terminal 10.

Step S1.1: The user operation accepting unit 14 confirms that the authentication information 13b is registered in the data storage unit 13. It is assumed here that the authentication information 13b is registered.

Step S1.2: Next, the user operation accepting unit 14 confirms whether the cloud storage access information 13a is registered in the data storage unit 13. It is assumed here that the cloud storage access information 13a is registered.

Step S1.3: The display control unit 15 of the user operation accepting unit 14 displays a list of the cloud storage access information 13a acquired from the data storage unit 13, on the display device 102. Thus, the user can determine which cloud storage 50 to use. The user selects one of the cloud storage access information items 13a.

Step S1.4: The user operation accepting unit 14 accepts the user's selection. Then, a list of document data that can be printed is acquired, from the data storage unit 13. Document data that can be printed means data of a file format supported by the mobile terminal 10. "Supported by" means data that the mobile terminal 10 recognizes as a file.

Step S1.5: The display control unit 15 of the user operation accepting unit 14 displays, on the display device 102, a list of document data items that can be printed. The user selects document data to be printed.

Step S1.6: The user operation accepting unit 14 accepts the user's selection, and then requests a print start instruction for this document data. For example, a message such as "Please press the start button displayed on the mobile terminal 10 when printing", etc., is displayed. The user performs an operation to start printing.

Step S1.7: The user operation accepting unit 14 accepts the instruction to start printing, and requests the data storage unit 13 to transmit the specified document data.

Step S1.7.1: The data storage unit 13 first issues a connection request to the public line communication unit 11. That is, the data storage unit 13 requests to connect with the cloud storage 50 selected in step S1.3. This request includes the cloud storage access information 13a.

Step S1.7.1.1: The public line communication unit 11 receives, from the data storage unit 13, the cloud storage access information 13a to connect to the specified cloud storage 50, and connects to the cloud storage 50 by using the received cloud storage access information 13a. In this case, the communication destination can be identified by the URL, and only the user name and password are to be used for authentication.

Step S1.7.2: Upon successful connection, the data storage unit 13 requests the public line communication unit 11 to transmit the document data specified in step S1.5.

Step S1.7.2.1: The public line communication unit 11 transmits the document data to the cloud storage 50. Accordingly, the document data is accumulated in the cloud storage 50, and a report indicating successful transmission and a response are returned from the cloud storage 50. The successful transmission means that the transmission has been successful (200 OK in the case of HTTP), and the response is transmitted from the specific cloud storage 50 as described below.

Step S1.8: Next, when the connection is successful, the data operating unit 16 creates a data URL. For example, when a file is specified as the cloud storage 50 by FTP, the file at the end of the URL stored in step S1.7, becomes the data URL. When a folder is specified as the cloud storage 50 by FTP, any file name (for example, 001.dat) added by the data operating unit 16 to the URL specified by FTP, becomes the data URL (<FTP folder URL>/001.dat). Note that the data URL does not necessarily have to be created by the data operating unit 16, and the data URL itself may be included in the response of step S1.7.2.1. That is, the cloud storage 50 may create a part of the data URL or the whole data URL and transmit the data URL to the mobile terminal 10. When a part of the data URL is created, the data operating unit 16 complements the remaining part.

In the case of Google Drive, since the file ID of the stored document data (file) is included in the response, the data URL is created by using the file ID. For example, the file ID of "http://https://drive.google.com/open?id=<file ID>" is the data URL.

Step S1.9: Next, the display control unit 15 of the user operation accepting unit 14 displays a message or a screen, instructing the user to bring the mobile terminal 10 closer to the multifunction peripheral 30, on the display device 102 of the mobile terminal 10. Accordingly, the user brings the mobile terminal 10 closer to the multifunction peripheral 30.

Step S1.10: A description is given of FIG. 9B. The user operation accepting unit 14 sends a connection request to the short-range wireless communication unit 12, at the same time or in parallel. When the user brings the mobile terminal 10 closer to the multifunction peripheral 30, a short-range wireless communication connection is made, and it is confirmed whether the short-range wireless communication device 109 of the mobile terminal 10 and the short-range wireless communication device 207 of the multifunction peripheral 30 are a communicable combination. This is done because when the short-range wireless communication device 109 and the short-range wireless communication device 207 conform to NFC, communication can be performed; however, communication may not be possible depending on the communication standard of the non-contact type card.

Step S1.10.1: When communication is possible, the short-range wireless communication unit 12 connects to the short-range data communication unit 32 of the multifunction peripheral 30.

Step S1.11: When the connection is successful, the user operation accepting unit 14 requests the short-range wireless communication unit 12 to transmit the authentication information 13b of the multifunction peripheral 30, the cloud storage access information 13a, and the data URL. A Quick Response (QR) code (registered trademark) in which these information items are encoded, may be displayed on the display device 102 of the mobile terminal 10, and the QR code may be read by an imaging device of the multifunction peripheral 30.

Step S1.11.1: The short-range wireless communication unit 12 transmits the authentication information 13b of the multifunction peripheral 30, the cloud storage access information 13a, and the data URL, to the multifunction peripheral 30. The short-range data communication unit 32 of the multifunction peripheral 30 receives these pieces of information.

Step S1.11.2: The short-range data communication unit 32 sends the authentication information 13b, the cloud storage access information 13a, and the data URL to the data analyzing unit 33.

Step S1.11.3: The data analyzing unit 33 confirms (authenticates) whether login to the multifunction peripheral 30 is possible by the acquired authentication information 13b. When the user is unable to log in, the data analyzing unit 33 causes the user I/F unit 36 to display a message indicating an authentication error, and warns the user.

Step S2: Next, the data analyzing unit 33 of the multifunction peripheral 30 sends a connection request, together with the received cloud storage access information 13a and the data URL, to the LAN communication unit 31.

Step S2.1: The LAN communication unit 31 connects to the cloud storage 50 using the URL in the cloud storage access information 13a, and logs in by using the user name and the password (receives authentication by the cloud storage 50). Here, it is assumed that communication is successful.

Step S3: Next, the data analyzing unit 33 sends a request to receive the document data, together with the URL and the data URL, to the LAN communication unit 31.

Step S3.1: The LAN communication unit 31 acquires the document data from the cloud storage 50 by using the URL and the data URL.

Step S4: The data analyzing unit 33 sends a print instruction together with the acquired document data, to the printing unit 34.

Step S4.1: Accordingly, the printing unit 34 prints the document data on a recording medium, such as paper.

Step S5: Upon receiving a print result from the printing unit 34, the data analyzing unit 33 sends a print completion report to the user I/F unit 36.

Step S5.1: The user I/F unit 36 displays the print completion report on the operation panel 202.

As described above, the document data of the mobile terminal 10 can be transmitted to the cloud storage 50 and printed out from the multifunction peripheral 30.

Note that the sequence of FIGS. 9A and 9B is merely an example; for example, the order of performing steps S1.1 and S3.1 may be in an opposite order, or these steps may be performed at the same time.

Furthermore, generally, it is also possible to set print settings (settings such as color/monochrome and double-sided/single sided, etc.) before step S1.5.

<Omission of Cloud Storage Selection>

In the processes of FIGS. 9A and 9B, the user selects the cloud storage 50 in step S1.3; however, this selection may not be required. When it is assumed that the user will repeatedly use the same cloud storage 50, there is no need to select the cloud storage 50 every time. In order to realize the omission of the selection, the user may select the cloud storage access information and store the selected cloud storage access information in the mobile terminal 10, in advance.

FIG. 9C is an example of a sequence diagram illustrating a procedure in which the mobile terminal 10 communicates with the multifunction peripheral 30 and the multifunction peripheral 30 prints the document data. In the description of FIG. 9C, mainly the differences from FIG. 9A will be described. In FIG. 9C, the data storage unit 13 stores priority cloud storage access information 13d. The priority cloud storage access information 13d is information for accessing the cloud storage 50 that the user preferentially uses, and includes information input to the access information input screen (communication information such as an IP address of the cloud storage 50 and authentication information, etc.). In FIG. 9C, there are no steps S1.2 and S1.3 of FIG. 9A or processes related to these steps. Therefore, when the user activates the application in step S1, the user only performs the processes of the displaying the list of documents in step S1.4 and selecting the document in step S1.5.

Furthermore, the mobile terminal 10 may automatically perform other processes of FIG. 9C without the user's instruction or operation, upon being triggered by the mobile terminal 10 approaching the multifunction peripheral 30. First, the mobile terminal 10 activates the application in step S1, and acquires authentication information. Also, the user performs steps S1.4 and S1.5 in advance. Furthermore, the mobile terminal 10 automatically transmits the document to the cloud storage 50 in steps S1.6 to S1.9.

Next, when the user brings the mobile terminal 10 closer to the multifunction peripheral 30, the processes of FIG. 9B are performed, by being triggered by the start of the short-range wireless communication. Therefore, the user can select a document and print the by document merely bringing the mobile terminal 10 closer to the multifunction peripheral 30. Note that the approaching of the mobile terminal 10 to the multifunction peripheral 30 is detected by the fact that short-range wireless communication between the mobile terminal 10 and the multifunction peripheral 30 has started (detecting each other).

<Security>

As described above, the document data transmitted to the cloud storage 50 can be printed by the multifunction peripheral 30. However, if the user can select any cloud storage 50 as in the present embodiment, there is a possibility that a virus, etc., enters the cloud storage 50 or the document data is contaminated with a virus, etc.

For example, there are cases where just by accessing a malicious site, the multifunction peripheral 30 may be infected by a virus, or the stored document data may be falsified. If the user uses such a malicious cloud storage 50, the multifunction peripheral 30 may access a file stored in the malicious cloud storage 50, causing the multifunction peripheral 30 to be infected with a virus, or to print out falsified document data.

Therefore, in the present embodiment, the security problem caused by using any cloud storage 50, is solved as follows.

<Restriction of Cloud Storage 50 that is Access Destination>

By restricting the cloud storage 50 that can be accessed by the multifunction peripheral 30, it is possible to avoid the deterioration in security. Therefore, the administrator restricts the cloud storage 50 that can be accessed by the multifunction peripheral 30, as follows. Note that the administrator is a person who manages, operates, and maintains, etc., the use of the multifunction peripheral 30.

Figure 10:
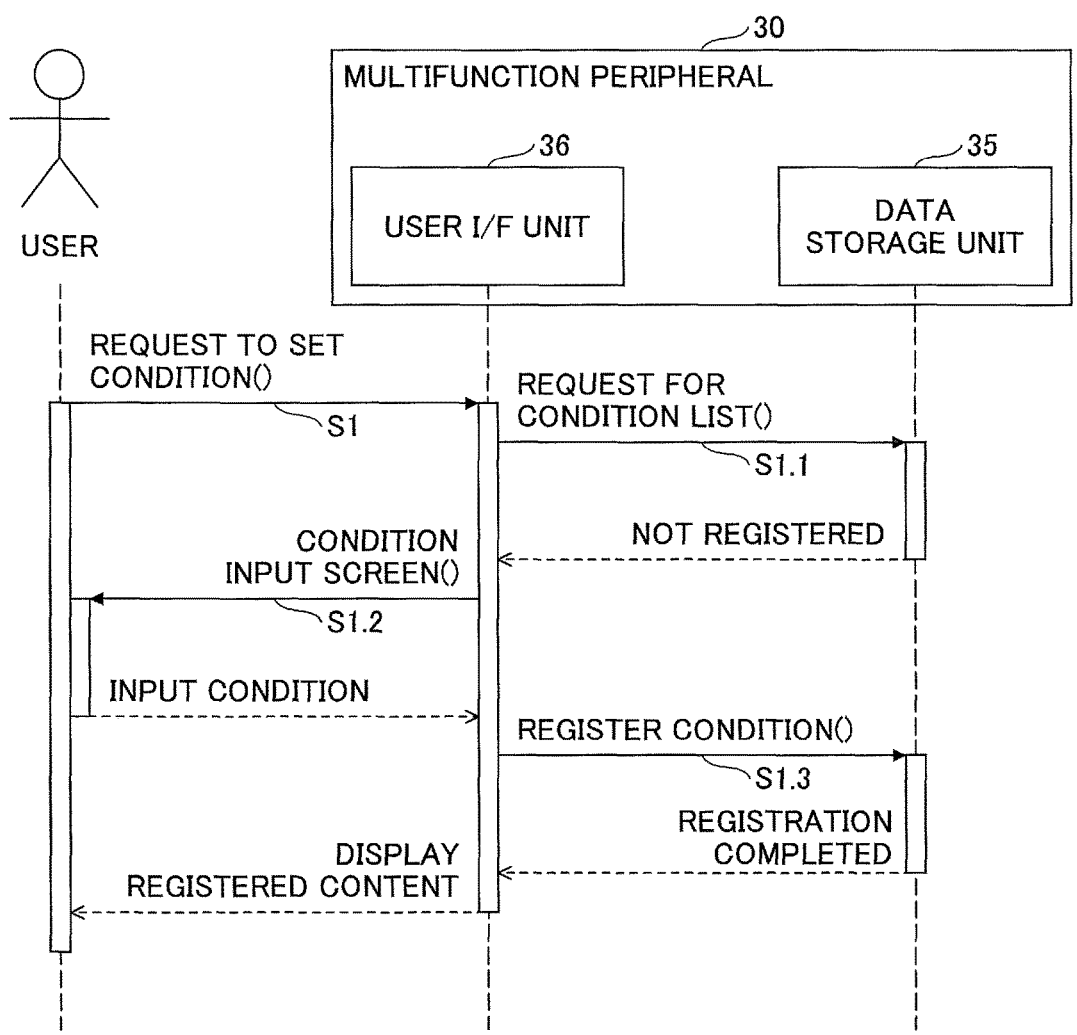
FIG. 10 is an example of a sequence diagram illustrating a procedure in which an administrator sets conditions to restrict the method of acquiring document data in the cloud storage according to an embodiment of the present invention.

FIG. 10 is an example of a sequence diagram illustrating a procedure in which the administrator sets conditions to restrict the method of acquiring document data in the cloud storage 50. The procedure will be described with reference to a screen 511 for setting the conditions of the acquisition method, illustrated in FIG. 11.

Step S1: The administrator operates the multifunction peripheral 30 to display the screen 511 for setting the conditions of the acquisition method. It is typical to perform this operation from the setting menu of the multifunction peripheral 30, etc., and it is recommended that only the administrator can make this setting, especially in consideration of security. Therefore, the administrator logs in by the administrator's authority.

Step S1.1: The user I/F unit 36 accepts the operation by the administrator and confirms whether the conditions of the acquisition method are stored in the data storage unit 13. Since there is no registered condition of an acquisition method at the initial time, the user I/F unit 36 determines that that conditions are not yet registered.

Step S1.2: The display control unit 38 of the user I/F unit 36 displays, on the operation panel 202, the screen 511 used for having the administrator to input the conditions of the acquisition method. Accordingly, the administrator inputs the conditions of the acquisition method. An example of the screen 511 is illustrated in FIG. 11.

Step S1.3: The user I/F unit 36 accepts the input of conditions of the acquisition method by the administrator, and causes the data storage unit 13 to store the conditions of the acquisition method. The display control unit 38 of the user I/F unit 36 displays a registration completion report on the operation panel 202.

FIG. 11 is a diagram illustrating an example of the screen 511 for inputting the conditions of the acquisition method. This screen 511 is a screen used by the administrator to restrict the cloud storage 50 that can be accessed by the multifunction peripheral 30. In FIG. 11, a message, reading "a. Use only address beginning with following" is displayed together with a radio button 512, and a message reading "b. Do not use address beginning with following" is displayed together with a radio button 513. Furthermore, the screen 511 also has an address input field 514.

For example, when the administrator selects the radio button 512 and enters "*.storage.*" in the address input field 514, the multifunction peripheral 30 can only access the cloud storage 50 with an address (URL) including ".storage." That is, the multifunction peripheral 30 is unable to access the cloud storage 50 that does not have this address. When only a set address is allowed, such an address is referred to as a white list.

Furthermore, for example, when the administrator selects the radio button 513 and enters "*.free.*" in the address input field 514, the multifunction peripheral 30 is unable to access the cloud storage 50 having an address including ".free." That is, the multifunction peripheral 30 is unable to access the cloud storage 50 having this address. When a set address is not allowed, such an address is referred to a black list.

Accordingly, even when a URL of the cloud storage 50, whose reliability is unknown, is transmitted from the mobile terminal 10, addresses other than those of the whitelist are not used, and addresses of the black list are not used, and therefore it is possible to avoid a deterioration in the security.

Note that in this example, only the conditions of the acquisition method according to the addresses have been described; however, the conditions of the acquisition method are not limited to addresses. For example, access restriction is also possible according to the size or the content of document data. For example, printing of document data having a size larger than a predetermined size may be prohibited, or printing of document data including a particular word (for example, CONFIDENTIAL) may be prohibited, etc. In this manner, the document data that can be acquired by the multifunction peripheral 30 may be restricted. For example, even if the user erroneously transmits document data having a size larger than a predetermined size or document data having a very large number of pages to the cloud storage 50, it is possible to prevent the multifunction peripheral 30 from printing this document data. Furthermore, since the user can recognize a rule that the multifunction peripheral 30 is unable to print document data including a word "CONFIDENTIAL", it is possible to prevent confidential document data from being inadvertently registered in the cloud storage 50.

Note that in these cases, there is a risk that the multifunction peripheral 30 may read the document data, so it is preferable to check the document data in advance by a server, etc., that performs a virus check.

Furthermore, the user name of the mobile terminal 10 (for example, the user name of the authentication information 13b) may be set as a condition, or access may be restricted according to the user name of the cloud storage access information 13a. For example, if the multifunction peripheral 30 is inside the company, only predetermined users among the employees may be able to cause the multifunction peripheral 30 to access the cloud storage 50. In this way, as long as the information has been acquired by the multifunction peripheral 30 by short-range wireless communication, the multifunction peripheral 30 can restrict access by using the information.

Furthermore, since the authentication of the user is performed at the multifunction peripheral 30, there may be a restriction that the multifunction peripheral 30 is unable to access the cloud storage 50 unless the user name (the user name of the authentication information 13b) authenticated by the multifunction peripheral 30 matches the user name of the cloud storage access information 13a.

Furthermore, there can also be an access restriction that access to the cloud storage 50 is allowed only within a specific time period, based on the time when the mobile terminal 10 and the multifunction peripheral 30 have communicated with each other by short-range wireless communication. Furthermore, it may be possible to combine time with the user, such as allowing access only to a specific user.

Furthermore, only the mobile terminal 10 provided by the company in which the multifunction peripheral 30 is installed, may be allowed to print via the cloud storage 50. As the mobile terminal 10 assigned by the company, the user name of the authentication information 13b is a user name fixed by the company. Accordingly, the company can specify the user who uses the cloud storage 50.

FIG. 12 is an example of a sequence diagram illustrating a process performed by the multifunction peripheral 30 when a condition of the acquisition method is not satisfied. The process of FIG. 12 is executed following step S1.11.1 of FIG. 9B.

Step S2: As described above, the data analyzing unit 33 of the multifunction peripheral 30 has acquired the authentication information 13b, the cloud storage access information 13a, and the data URL from the mobile terminal 10, and the authentication of the user has been completed. The data analyzing unit 33 requests the data storage unit 13 for the conditions of the acquisition method.

Step S3: Upon acquiring the conditions of the acquisition method stored in the data storage unit 13, the data analyzing unit 33 compares the conditions of the acquisition method with the authentication information 13b, compares the conditions of the acquisition method with the cloud storage access information 13a, or compares the conditions of the acquisition method with the authentication information 13b and the cloud storage access information 13a, to determine whether the document data can be acquired from the cloud storage 50. When the document data can be acquired, step S2 and subsequent steps of FIG. 9B are executed.

Step S4: When the data analyzing unit 33 determines that access is prohibited, the data analyzing unit 33 requests the user I/F unit 36 to display an error.

Step S4.1: The display control unit 38 of the user I/F unit 36 displays, on the operation panel 202, that access is prohibited. Accordingly, the user can recognize that it is not possible to access the cloud storage 50 to print the document data.

<Overview>

As described above, in the communication system 100 according to the present embodiment, the mobile terminal 10 stores, through a public line, document data in the cloud storage 50 that can be used by a user on the Internet, and transmits the acquisition method for acquiring the document data by short-range wireless communication, and therefore there is no need for an exclusive-use server for the multifunction peripheral 30. Since the device (the communication I/F 107) used by the mobile terminal 10 to connect to the Internet via the public line, and the short-range wireless communication device 109 used to connect to the multifunction peripheral 30, are different devices, the user does not need to switch to the connection with the wireless LAN after sending the document data to the cloud storage 50.

<Other Application Examples>

Although the best modes for carrying out the present invention have been described above by way of examples, the present invention is not limited to these examples, and various modifications and substitutions may be made without departing from the spirit of the present invention.

For example, although it is described that the mobile terminal 10 uses a public line when connecting to the Internet, the connection is not limited to a public line such as 3G/4G/LTE, as long as the connection is an Internet connection that can be used at the same time as a short-range wireless communication device. As one example, Worldwide Interoperability for Microwave Access X (WiMAX) is known.

According to one embodiment of the present invention, a communication system that enables a device to acquire output data without an exclusive-use server, is provided.

The communication system, the mobile terminal, and the device are not limited to the specific embodiments described in the detailed description, and variations and modifications may be made without departing from the spirit and scope of the present invention.

What is claimed is:

1. A communication system comprising:
    a mobile terminal; and
    a device,
    wherein the mobile terminal and an information processing apparatus communicate with each other over a first communication network, the mobile terminal and the device communicate with each other over a second communication network, and the device and the information processing apparatus communicate with each other over a third communication network,
    wherein the mobile terminal includes a first processor, in communication with a first memory, executing a process including:
        transmitting, over the first communication network, output data to be output by the device, to the information processing apparatus, the output data being transmitted to the information processing apparatus upon accepting an instruction via a user interface displayed on a display device of the mobile terminal; and
        transmitting, over the second communication network, access information to the device, the access information specifying a communication destination of the information processing apparatus from which the output data is to be acquired by the device, and
    wherein the device includes a second processor, in communication with a second memory, executing a process including:
        receiving the access information from the mobile terminal;
        acquiring the output data from the information processing apparatus according to the access information specifying the communication destination of the information processing apparatus, the access information being acquired from the mobile terminal through the second communication network; and
        outputting the output data acquired from the information processing apparatus.

2. The communication system according to claim 1, wherein the first communication network and the second communication network can be used at the same time or in parallel, by the mobile terminal.

3. The communication system according to claim 1, wherein the access information includes address information identifying the output data held by the information processing apparatus connected to the first communication network and the third communication network.

4. The communication system according to claim 3, wherein
    the access information further includes authentication information used for receiving authentication by the information processing apparatus, and
    wherein the acquiring of the output data by the device includes acquiring the output data from the information processing apparatus according to the access information, in response to the authentication performed based on the authentication information being successful.

5. The communication system according to claim 1, wherein
    the first communication network uses a public line to transmit the output data to the information processing apparatus, and
    the second communication network uses short-range wireless communication to transmit the access information to the device.

6. The communication system according to claim 1, wherein the second processor included in the device executes the process further including:
    accepting a setting of a condition relating to whether to acquire the output data from the information processing apparatus; and
    acquiring the output data from the information processing apparatus, in response to the access information matching the condition.

7. The communication system according to claim 6, wherein the accepting of the setting of the condition by the device includes accepting the setting of information relating to a Uniform Resource Locator, URL, that that can be accessed by the device, or information relating to a URL that cannot be accessed by the device.

8. The communication system according to claim 1, wherein
    the access information includes a URL, and
    the acquiring of the output data by the device includes acquiring the output data specified by the URL.

9. The communication system according to claim 1, wherein the first processor included in the mobile terminal executes the process further including accepting a setting of the access information.

10. The communication system according to claim 1, wherein
    the first memory included in the mobile terminal stores, in advance, communication information used for communicating with the information processing apparatus,
    the transmitting of the output data over by the first communication network by the mobile terminal includes transmitting, to the information processing apparatus, the output data that is identified by accepting a selection made by a user based on the communication information, and
    the transmitting of the access information over the second communication network by the mobile terminal includes transmitting the access information to the device, upon being triggered by a start of communication with the device.

11. The communication system according to claim 1, wherein
    the first processor further executes a process including:
        registering the access information upon receiving an input of the access information from a user of the mobile terminal; and
        confirming a connection between the mobile terminal and the information processing apparatus by using the access information.

12. The communication system according to claim 1, wherein the access information includes information that specifies a cloud storage service among a plurality of cloud storage services.

13. A mobile terminal comprising a processor, in communication with a memory, executing a process including:
- transmitting, over a first communication network, output data to be output by a device, to an information processing apparatus over the first communication network, the output data being transmitted to the information processing apparatus upon accepting an instruction via a user interface displayed on a display device of the mobile terminal; and
- transmitting, over a second communication network different from the first communication network, access information to the device over the second communication network, the access information specifying a communication destination of the information processing apparatus from which the output data is to be acquired by the device.

14. The mobile terminal according to claim 13, wherein the access information includes information that specifies a cloud storage service among a plurality of cloud storage services.

15. A device comprising a processor, in communication with a memory, executing a process including:
- receiving, over a second communication network, access information from a mobile terminal, the access information specifying a communication destination of an information processing apparatus from which output data is to be acquired by the device;
- acquiring, over a third communication network, the output data from the information processing apparatus according to the access information specifying the communication destination, the access information being acquired from the mobile terminal over the second communication network, the output data being received by the information processing apparatus from the mobile terminal over a first communication network; and
- outputting the output data.

16. The device according to claim 15, wherein the access information includes information that specifies a cloud storage service among a plurality of cloud storage services.

* * * * *